United States Patent
Li et al.

(10) Patent No.: US 8,921,459 B2
(45) Date of Patent: Dec. 30, 2014

(54) INK USED FOR INK-JET COMPUTER-TO-PLATE AND PREPARATION METHOD THEREOF

(75) Inventors: Huiling Li, Beijing (CN); Mingming Qin, Beijing (CN); Yanlin Song, Beijing (CN)

(73) Assignee: Institute of Chemistry, Chinese Academy of Sciences, Beijing (CN)

( * ) Notice: Subject to any disclaimer, the term of this patent is extended or adjusted under 35 U.S.C. 154(b) by 27 days.

(21) Appl. No.: 13/814,178

(22) PCT Filed: Oct. 25, 2010

(86) PCT No.: PCT/CN2010/078063
§ 371 (c)(1),
(2), (4) Date: Feb. 4, 2013

(87) PCT Pub. No.: WO2012/016397
PCT Pub. Date: Feb. 9, 2012

(65) Prior Publication Data
US 2013/0131219 A1    May 23, 2013

(30) Foreign Application Priority Data
Aug. 6, 2010   (CN) .......................... 2010 1 0248058

(51) Int. Cl.
*C09D 11/10* (2014.01)
*C09D 11/38* (2014.01)
*C09D 11/30* (2014.01)

(52) U.S. Cl.
CPC ............. *C09D 11/30* (2013.01); *C09D 11/38* (2013.01); *C09D 11/10* (2013.01)
USPC ............ 523/456; 523/160; 524/317; 524/378

(58) Field of Classification Search
CPC ......... C08L 29/04; C08L 61/04; C08L 61/06; C08L 63/00; C09D 11/10; C09D 11/103; C08K 5/06; C08K 5/10; C08K 5/103

USPC ................... 524/315, 377; 523/456; 210/348
See application file for complete search history.

(56) References Cited

U.S. PATENT DOCUMENTS 4,959,661 A * 9/1990 Buxton et al. ................ 347/100

FOREIGN PATENT DOCUMENTS

| CN | 1324901 | 12/2001 | |
| EP | 1158029 A1 * | 11/2001 | ............. C09D 11/00 |
| EP | 1903079 | 3/2008 | |
| EP | 2042304 | 1/2009 | |
| JP | 08-324145 | 10/1996 | |
| JP | 2002-020666 | 1/2002 | |
| JP | 2007-276442 | 10/2007 | |
| JP | 2009249578 | 10/2009 | |
| WO | 0134394 | 5/2001 | |
| WO | 02094571 | 11/2002 | |
| WO | 2010021186 | 2/2010 | |

* cited by examiner

Primary Examiner — Vu A Nguyen
(74) Attorney, Agent, or Firm — Volpe and Koenig, P.C.

(57) ABSTRACT

Disclosed are a kind of ink used for ink-jet computer-to-plate (CTP) technology and the preparation method thereof. The ink comprises, in mass percent, 5% to 20% of cosslinkable resin, 5% to 25% of light solvent, and 55% to 90% of deionized water. The preparation method includes: mixing the components with stirring at room temperature; multistage filtering for removing insoluble substance and impurity in mixed solution after the crosslinkable resin being completely dissolved in the solvent; and thus to obtain the ink. An image with high resolution can be formed upon printing the ink on a treated aluminum plate and thermocuring. The aluminum plate can be printed directly by a printer, which reduces post treatment.

6 Claims, 1 Drawing Sheet

INK USED FOR INK-JET COMPUTER-TO-PLATE AND PREPARATION METHOD THEREOF

This application is a 35 U.S.C. §371 national phase application of PCT/CN2010/078063, which was filed Oct. 25, 2010 and is incorporated herein by reference as if fully set forth.

FIELD OF THE INVENTION

The present invention pertains to the field of ink, and relates to an ECO-solvent ink which can improve image resolution, in particular relates to an ECO-solvent ink, which is used for making plates by direct printing in ink-jet computer-to-plate (CTP) technique, and a preparation method thereof.

BACKGROUND OF THE INVENTION

In recent years, CTP technique representing the development direction of international advanced printing plate-making omits the conventional photosensitive imaging process and simplifies the plate-making procedure. However, CTP technique still limits to the thinking of photosensitive chemical imaging and still has the problem of pollution from chemical waste liquid in the post-treatment. With the introduction of many compulsory environmental protection standards in the world, the research on environment-friendly CTP technique has become a new hotspot in the frontier field of world's printing industry. Currently, it is reported that the inks as a core material of ink-jet CTP technique include water-soluble ink solution, thermosetting ink, ultraviolet (UV) curing ink, but the produced plate has a printing durability of 10,000 or 20,000 copies, and the imaging quality and the resolution of the printed matter are low. Therefore, developing a high-resolution ECO-solvent ink is a key deciding the direction of CTP plate-making.

Light solvent ink is a popular solvent ink in recent years, the main reasons lie in that it has a faint smell, the ink particles are fine and the images obtained by ink-jet printing are very nice. The greatest feature of a light solvent ink is its environmental friendliness, which is mainly embodied by the decrease of volatile organic compounds (VOC) and the disuse of toxic and harmful organic solvents (such as cyclohexanone and butanone) and eliminating the dependence on the ventilator in light solvent ink workshops. Light solvent ink is very popular in developed countries, while the conventional solvent ink almost has no market in Europe and the United States. Light solvent ink has become an inevitable development trend of the ink industry [Dai Bin and Qiao Xu, Production and Development of Propylene Glycol Ether Ester Series Solvents, *Anhui Chemical Industry*, 2007, 33, 3, 4-6.]. Light solvent ink is a solvent between the water-based ink and the solvent-based ink, possesses the advantages of the water-based ink and the solvent-based ink and has the features of environmental friendliness, high precision and outdoor weather resistance. However, the dibasic alcohol ether ester type solvent as a main component of light solvent ink has a complex production process and a long production flow, so that the market supply of such solvents is small and their cost is relatively high. The main advantages of the water-based ink are low cost, no pollution and bright printing colors, but since water as its main component has a slow speed of volatilization, the images ink-jet printed with a water-based ink are difficulty dried and absorbed by the medium. As a result, the water-based ink is mainly used on paper and media having a coating with various fibers (cloth) as substrate. Generally, the images formed by a water-based ink are used indoors owing to its poor weather resistance. According to the present invention, an ink with low cost and high environmental performance is prepared by choosing a mixture of water and a specific light solvent as the solvent of the ink, to further lower the toxicity brought about by the light solvent of the ink, and to give consideration to precision and outdoor weather resistance.

SUMMARY OF THE INVENTION

An object of the present invention is to overcome the defects existing in the prior ink-jet CTP method, and solve the problems limiting the rapid development and to application of ink-jet CTP, so as to provide an ECO-solvent ink that is used for ink-jet computer-to-plate. The ink can be used to print on aluminum substrate to make plates having a high printing durability and a high image resolution.

Another object of the present invention is to provide a method for preparing an ECO-solvent ink that is used for ink-jet computer-to-plate.

Aluminum substrate used as a substrate in ink-jet printing to make plates has high specific surface energy, both inorganic solution and organic solution can spread and infiltrate easily on its surface. Therefore, when an ordinary ink-jet ink is printed on the surface of an aluminum substrate to form an image, the ink diffuses severely, resulting in low image resolution. The present invention takes advantage of the high surface energy of the water system to ensure that the ink system containing a mixture of water and a light solvent forms small sprayed ink dots with a uniform shape during ink-jet printing (the high surface tension of the ink promotes the formation of liquid drops with uniform shape during spray of the ink). Meanwhile, the present invention takes advantage of the volatility and high precision of the light solvent to effectively decrease the diffusion of the ink on the surface of the aluminum substrate having high specific surface energy, so as to improve image resolution.

The ECO-solvent ink of the present invention, which is used for ink-jet computer-to-plate, is prepared by cross-linkable resin and mixed solvent. The ink of the present application is printed by ink-jet printer onto the surface of an aluminum substrate to form a printing image and obtain a plate for ink-jet computer-to-print, which can form a high-resolution image after curing and can be directly used for printing without any post-treatment; as a result, a high-quality ink-jet CTP plate is obtained.

According to the ECO-solvent ink of the present invention used for ink-jet computer-to-plate, which can improve image resolution, calculated in mass percent and based on the total mass of the ink, the ink comprises:

| | |
|---|---|
| cross-linkable resin | 5%~20% |
| light solvent | 5%~25% |
| deionized water | 55%~90%. |

The cross-linkable resin is at least one selected from the group consisting of commercial epoxy resin, phenolic resin, polyvinyl alcohol resin and etc. These types of resins are thermosetting ones; that is, they will be cured only at a temperature equal to or higher than a specific value, as a result, the print nozzles of the ink-jet printer are prevented from blocking resulted from the curing of the ink during the ink-jet process.

The light solvent is at least one selected from the group consisting of propylene glycol monomethyl ether, propylene glycol monomethyl ether acetate, propylene glycol monomethyl ether propionate, propylene glycol monomethyl ether butyrate and etc.

Preferably, the deionized water has an electric conductivity of lower than 10 μS/cm.

The ink of the present invention is a filtrate obtained by removing insoluble substances and/or impurities in the mixed solution for preparing the ink by means of multistage filtration.

The method of the present invention for preparing an ECO-solvent ink for ink-jet computer-to-plate, which can improve image resolution, comprises the following steps: calculated in mass percentage and based on the total mass of the ECO-ink, cross-linkable resin in an amount of 5%~20%, light solvent in an amount of 5%~25% and deionized water in an amount of 55%~90% are mixed with stirring at room temperature; after the cross-linkable resin is dissolved completely, mixed solution thus obtained is undergone multistage filtration to remove insoluble substances and/or impurities to obtain a filtrate as the ECO-ink of the present invention.

The multistage filtration may be carried out by filtering the mixed solution repeatedly with filter membranes, or may be carried out by filtering the mixed solution with sand core funnels and filter membranes successively. Preferably, the mixed solution is filtrated by sand core funnels and filter membranes successively. Specifically, the mixed solution is firstly filtered with sand core funnel to remove insoluble substances and/or impurities, and then is filtered through filter membranes with a micron-level pore size to remove tinier insoluble substances and/or impurities, so as to obtain a filtrate as the ECO-ink of the present invention.

With regard to the filtration using sand core funnels, it is preferred to firstly use a glass sand core funnel with a pore size of 20-30 μm (G1 type glass sand core funnel), and then use a glass sand core funnel with a pore size of 3-4 μm (G4 type glass sand core funnel).

With regard to the filtration using filter membranes with a micron-level pore size, it is preferred to firstly use a polytetrafluoroethene microporous filter membrane with a pore size of 0.45 μm and then use a polytetrafluoroethene microporous filter membrane with a pore size of 0.22 μm.

The cross-linkable resin in the ink has desirable amphiphilicity and thermosetting property, water has the characteristic of slow volatilization to prevent the ink from drying up quickly due to volatilization, and the light solvent having the basic physical properties those meet the requirements of an ink-jet printer conforms to the industrial standard of the ink for ink-jet printing (QB/T 2730.1-2005). Therefore, the prepared ink has features such as moderate diffusibility, high resolution of print, high oleophilicity of ink marks, high inking speed and high durability.

The ink of the present invention is printed on an aluminum substrate and is cured at 150° C. for 2 min to obtain a plate with high resolution, which can be directly used for printing without other chemical treatment.

When the ink of the present invention is used in an ink-jet CTP7600 system (which can refer to Chinese Patent Application No. 200510132248.4 (CN1800982A), titled as "Ink jet Imaging Based Computer-to-Plate Method and Apparatus"), the produced plate can achieve a screen dot reproducibility of 98% or higher and a resolution of above 175 LPI. The printing result shows that the inking speed is high, the information of screen dot is complete and the durability is up to 50,000 copies.

DETAILED DESCRIPTION OF THE EMBODIMENTS

The microscope photographs of the patterns formed by printing the ink prepared in the following examples on the surface of an aluminum substrate are observed and recorded with a microscope (Olympus BX51 microscope) and an image sensor CCD (China, MicroVision MV-VS 078FC) connected to the microscope. The electronic microscope photographs of the patterns formed by printing the ink on the surface of an aluminum substrate are observed with a field emission electron microscope (Japan, JEOL JSM-6700).

EXAMPLE 1

Measured in mass percentage on the basis of the total mass of ink, 5% of polyvinyl alcohol resin (Organic Chemical Plant of Beijing Eastern Petrochemical Co., Ltd.), 5% of propylene glycol monomethyl ether and 90% of deionized water (electric conductivity: <10 μS/cm) are mixed with stirring at room temperature. After polyvinyl alcohol resin is completely dissolved, the solution is filtered repeatedly through filter membranes to remove insoluble substances and/or impurities. The obtained filtrate is the ink.

Figure 1:
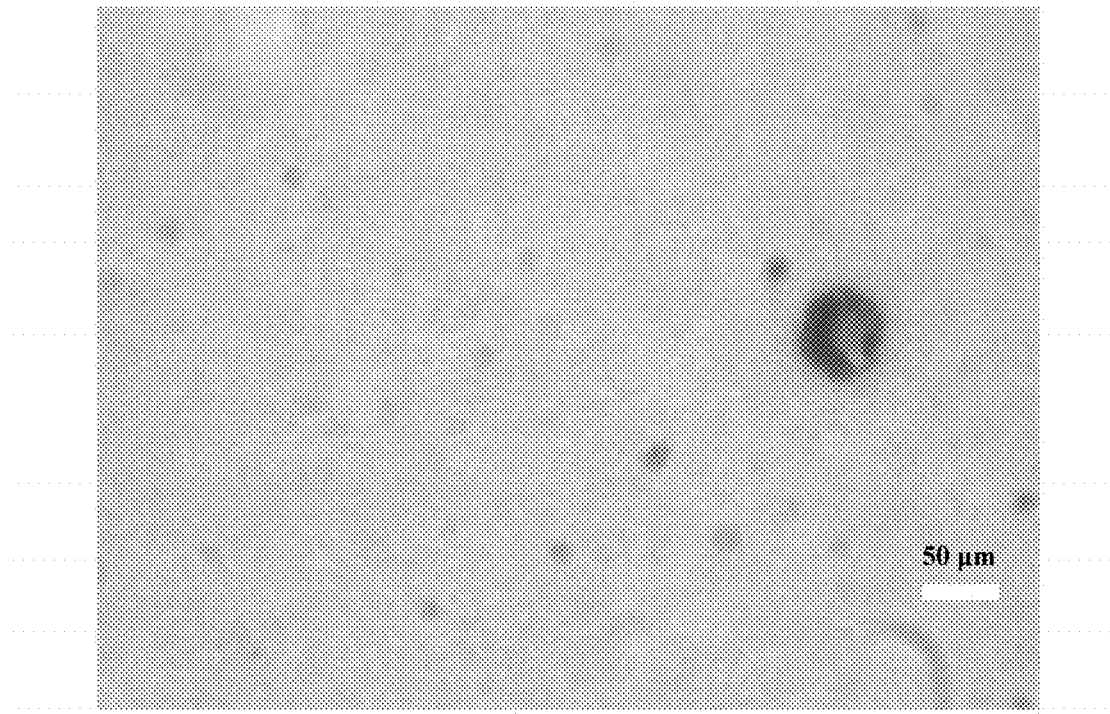
FIG. 1 is a microscope photograph of a pattern formed by printing the ink prepared in Example 1 of the present invention on the surface of an aluminum substrate.

The ink prepared above is used in an ink-jet CTP7600 system (refer to Chinese Patent Application No. 200510132248.4, titled as "Ink-jet Imaging Based Computer-to-Plate Method and Apparatus"), the produced plate can achieve a screen dot reproducibility of 98% or higher, a resolution of above 175 LPI and a durability up to 50,000 copies. Observed by a microscope, as shown in FIG. 1, the obtained plate is made from microcosmic ink dots.

EXAMPLE 2

Measured in mass percentage on the basis of the total mass of ink, 20% of phenolic resin (Tangshan Jinsha Chemical Co., Ltd.), 25% of propylene glycol monomethyl ether and 55% of deionized water (electric conductivity: <10 μS/cm) are mixed with stirring at room temperature. After phenolic resin is completely dissolved, the solution is filtered repeatedly through filter membranes to remove insoluble substances and/or impurities. The obtained filtrate is the ink.

Figure 2:
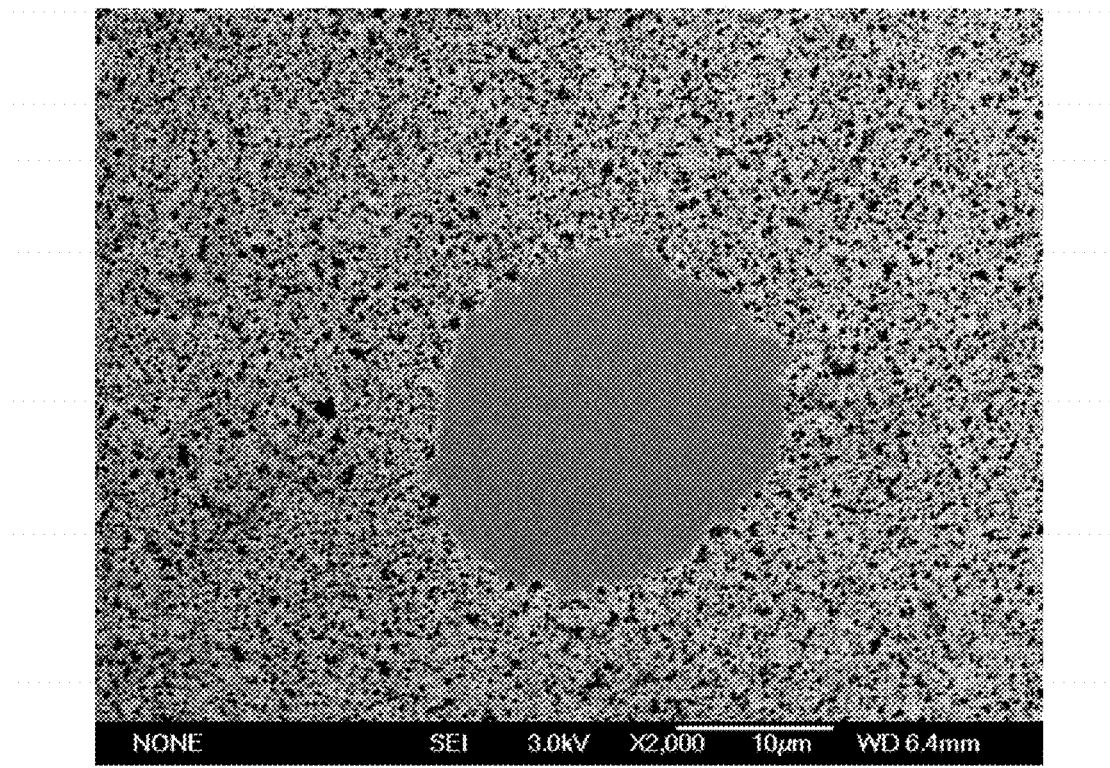
FIG. 2 is an electronic microscope photograph of a pattern formed by printing the ink prepared in Example 2 of the present invention on the surface of an aluminum substrate.

The ink prepared above is used in an ink-jet CTP7600 system (refer to Chinese Patent Application No. 200510132248.4, titled as "Ink-jet Imaging Based Computer-to-Plate Method and Apparatus"), the produced plate can achieve a screen dot reproducibility of 98% or higher, a resolution of above 175 LPI, and a durability up to 50,000 copies. Observed by a microscope, the ink dots of the obtained plate are as those shown in FIG. 2.

EXAMPLE 3

Measured in mass percentage on the basis of the total mass of ink, 10% of phenolic resin, 15% of propylene glycol monomethyl ether and 75% of deionized water (electric conductivity: <10 μS/cm) are mixed with stirring at room temperature. After phenolic resin is completely dissolved, the solution is undergone multistage filtration to remove insoluble substances and/or impurities. The obtained filtrate is the ink. The multistage filtration is carried out by a glass sand core funnel (G1 type glass sand core funnel) with a pore size of 20 µm, a glass sand core funnel (G4 type glass sand core funnel) with a pore size of 3 µm, a polytetrafluoroethene microporous filter membrane with a pore size of 0.45 µm and a polytetrafluoroethene microporous filter membrane with a pore size of 0.22 µm successively.

EXAMPLE 4

Measured in mass percentage on the basis of the total mass of ink, 10% of epoxy resin (Shanghai Lujia Water Coating Co., Ltd.), 15% of propylene glycol monomethyl ether acetate and 75% of deionized water (electric conductivity: <10 µS/cm) are mixed with stirring at room temperature. After epoxy resin is completely dissolved, the solution is undergone multistage filtration to remove insoluble substances and/or impurities. The obtained filtrate is the ink. The multistage filtration is carried out by a glass sand core funnel (G1 type glass sand core funnel) with a pore size of 30 µm, a glass sand core funnel (G4 type glass sand core funnel) with a pore size of 4 µm, a polytetrafluoroethene microporous filter membrane with a pore size of 0.45 µm and a polytetrafluoroethene microporous filter membrane with a pore size of 0.22 µm successively.

EXAMPLE 5

Measured in mass percentage on the basis of the total mass of ink, 15% of polyvinyl alcohol resin, 15% of propylene glycol monomethyl ether and 70% of deionized water (electric conductivity: <10 µS/cm) are mixed with stirring at room temperature. After polyvinyl alcohol resin is completely dissolved, the solution is undergone multistage filtration to remove insoluble substances and/or impurities. The obtained filtrate is the ink. The multistage filtration is carried out by a glass sand core funnel (G1 type glass sand core funnel) with a pore size of 25 µm, a glass sand core funnel (G4 type glass sand core funnel) with a pore size of 3 µm, a polytetrafluoroethene microporous filter membranes with a pore size of 0.45 µm and a polytetrafluoroethene microporous filter membrane with a pore size of 0.22 µm successively.

EXAMPLE 6

Measured in mass percentage on the basis of the total mass of ink, 15% of the mixture of polyvinyl alcohol resin and phenolic resin (mass ratio between polyvinyl alcohol resin and phenolic resin is 1:1), 25% of propylene glycol monomethyl ether and 60% of deionized water (electric conductivity: <10 µS/cm) are mixed with stirring at room temperature. After polyvinyl alcohol resin and phenolic resin are completely dissolved, the solution is undergone multistage filtration to remove insoluble substances and/or impurities. The obtained filtrate is the ink. The multistage filtration is carried out by a glass sand core funnel (G1 type glass sand core funnel) with a pore size of 27 µm, a glass sand core funnel (G4 type glass sand core funnel) with a pore size of 3.5 µm, a polytetrafluoroethene microporous filter membrane with a pore size of 0.45 µm and a polytetrafluoroethene microporous filter membrane with a pore size of 0.22 µm successively.

EXAMPLE 7

Measured in mass percentage on the basis of the total mass of ink, 10% of the mixture of polyvinyl alcohol resin and phenolic resin (the mass ratio between polyvinyl alcohol resin and phenolic resin is 2:1), 25% of propylene glycol monomethyl ether and 65% of deionized water (electric conductivity: <10 µS/cm) are mixed with stirring at room temperature. After polyvinyl alcohol resin and phenolic resin is completely dissolved, the solution is undergone multistage filtration to remove insoluble substances and/or impurities. The obtained filtrate is the ink. The multistage filtration is carried out by a glass sand core funnel (G1 type glass sand core funnel) with a pore size of 22 µm, a glass sand core funnel (G4 type glass sand core funnel) with a pore size of 3 µm, a polytetrafluoroethene microporous filter membrane with a pore size of 0.45 µm and a polytetrafluoroethene microporous filter membrane with a pore size of 0.22 µm successively.

EXAMPLE 8

Measured in mass percentage on the basis of the total mass of ink, 15% of phenolic resin, 15% of propylene glycol monomethyl ether acetate and 70% of deionized water (electric conductivity: <10 µS/cm) are mixed with stirring at room temperature. After phenolic resin is completely dissolved, the solution is undergone multistage filtration to remove insoluble substances and/or impurities. The obtained filtrate is the ink. The multistage filtration is carried out by a glass sand core funnel (G1 type glass sand core funnel) with a pore size of 25 µm, a glass sand core funnel (G4 type glass sand core funnel) with a pore size of 3 µm, a polytetrafluoroethene microporous filter membrane with a pore size of 0.45 µm and a polytetrafluoroethene microporous filter membrane with a pore size of 0.22 µm successively.

EXAMPLE 9

Measured in mass percentage on the basis of the total mass of ink, 20% of phenolic resin, 15% of propylene glycol monomethyl ether propionate and 65% of deionized water (electric conductivity: <10 µS/cm) are mixed with stirring at room temperature. After phenolic resin is completely dissolved, the solution is undergone multistage filtration to remove insoluble substances and/or impurities. The obtained filtrate is the ink. The multistage filtration is carried out by a glass sand core funnel (G1 type glass sand core funnel) with a pore size of 25 µm, a glass sand core funnel (G4 type glass sand core funnel) with a pore size of 3 µm, a polytetrafluoroethene microporous filter membrane with a pore size of 0.45 µm and a polytetrafluoroethene microporous filter membrane with a pore size of 0.22 µm successively.

EXAMPLE 10

Measured in mass percentage on the basis of the total mass of ink, 20% of phenolic resin, 25% of propylene glycol monomethyl ether butyrate and 55% of deionized water (electric conductivity: <10 µS/cm) are mixed with stirring at room temperature. After phenolic resin is completely dissolved, the solution is undergone multistage filtration to remove insoluble substances and/or impurities. The obtained filtrate is the ink. The multistage filtration is carried out by a glass sand core funnel (G1 type glass sand core funnel) with a pore size of 25 µm, a glass sand core funnel (G4 type glass sand core funnel) with a pore size of 3 µm, a polytetrafluoroethene microporous filter membrane with a pore size of 0.45 µm and a polytetrafluoroethene microporous filter membrane with a pore size of 0.22 µm successively.

EXAMPLE 11

Measured in mass percentage on the basis of the total mass of ink, 15% of epoxy resin, 15% of propylene glycol monomethyl ether propionate and 70% of deionized water (electric conductivity: <10 μS/cm) are mixed with stirring at room temperature. After epoxy resin is completely dissolved, the solution is undergone multistage filtration to remove insoluble substances and/or impurities. The obtained filtrate is the ink. The multistage filtration is carried out by a glass sand core funnel (G1 type glass sand core funnel) with a pore size of 25 μm, a glass sand core funnel (G4 type glass sand core funnel) with a pore size of 3 μm, a polytetrafluoroethene microporous filter membrane with a pore size of 0.45 μm and a polytetrafluoroethene microporous filter membrane with a pore size of 0.22 μm successively.

EXAMPLE 12

Measured in mass percentage on the basis of the total mass of ink, 20% of epoxy resin, 25% of propylene glycol monomethyl ether butyrate and 55% of deionized water (electric conductivity: <10 μS/cm) are mixed with stirring at room temperature. After epoxy resin is completely dissolved, the solution is undergone multistage filtration to remove insoluble substances and/or impurities. The obtained filtrate is the ink. The multistage filtration is carried out by a glass sand core funnel (G1 type glass sand core funnel) with a pore size of 25 μm, a glass sand core funnel (G4 type glass sand core funnel) with a pore size of 3 μm, a polytetrafluoroethene microporous filter membrane with a pore size of 0.45 μm and a polytetrafluoroethene microporous filter membrane with a pore size of 0.22 μm successively.

EXAMPLE 13

Measured in mass percentage on the basis of the total mass of ink, 10% of epoxy resin, 25% of the mixture of propylene glycol monomethyl ether and propylene glycol monomethyl ether acetate (the mass ratio between propylene glycol monomethyl ether and propylene glycol monomethyl ether acetate is 1:1) and 65% of deionized water (electric conductivity: <10 μS/cm) are mixed with stirring at room temperature. After epoxy resin is completely dissolved, the solution is undergone multistage filtration to remove insoluble substances and/or impurities. The obtained filtrate is the ink. The multistage filtration is carried out by a glass sand core funnel (G1 type glass sand core funnel) with a pore size of 25 μm, a glass sand core funnel (G4 type glass sand core funnel) with a pore size of 3 μm, a polytetrafluoroethene microporous filter membrane with a pore size of 0.45 μm and a polytetrafluoroethene microporous filter membrane with a pore size of 0.22 μm successively.

EXAMPLE 14

Measured in mass percentage on the basis of the total mass of ink, 10% of phenolic resin, 25% of the mixture of propylene glycol monomethyl ether and propylene glycol monomethyl ether propionate (the mass ratio between propylene glycol monomethyl ether and propylene glycol monomethyl ether propionate is 1:1) and 65% of deionized water (electric conductivity: <10 μS/cm) are mixed with stirring at room temperature. After phenolic resin is completely dissolved, the solution is undergone multistage filtration to remove insoluble substances and/or impurities. The obtained filtrate is the ink. The multistage filtration is carried out by a glass sand core funnel (G1 type glass sand core funnel) with a pore size of 25 μm, a glass sand core funnel (G4 type glass sand core funnel) with a pore size of 3 μm, a polytetrafluoroethene microporous filter membrane with a pore size of 0.45 μm and a polytetrafluoroethene microporous filter membrane with a pore size of 0.22 μm successively.

EXAMPLE 15

Measured in mass percentage on the basis of the total mass of ink, 15% of phenolic resin, 20% of the mixture of propylene glycol monomethyl ether and propylene glycol monomethyl ether butyrate (the mass ratio between propylene glycol monomethyl ether and propylene glycol monomethyl ether butyrate is 1:1) and 65% of deionized water (electric conductivity: <10 μS/cm) are mixed with stirring at room temperature. After phenolic resin is completely dissolved, the solution is undergone multistage filtration to remove insoluble substances and/or impurities. The obtained filtrate is the ink. The multistage filtration is carried out by a glass sand core funnel (G1 type glass sand core funnel) with a pore size of 25 μm, a glass sand core funnel (G4 type glass sand core funnel) with a pore size of 3 μm, a polytetrafluoroethene microporous filter membrane with a pore size of 0.45 μm and a polytetrafluoroethene microporous filter membrane with a pore size of 0.22 μm successively.

EXAMPLE 16

Measured in mass percentage on the basis of the total mass of ink, 10% of epoxy resin, 25% of the mixture of propylene glycol monomethyl ether acetate and propylene glycol monomethyl ether propionate (the mass ratio between propylene glycol monomethyl ether acetate and propylene glycol monomethyl ether propionate is 1:2) and 65% of deionized water (electric conductivity: <10 μS/cm) are mixed with stirring at room temperature. After epoxy resin is completely dissolved, the solution is undergone multistage filtration to remove insoluble substances and/or impurities. The obtained filtrate is the ink. The multistage filtration is carried out by a glass sand core funnel (G1 type glass sand core funnel) with a pore size of 25 μm, a glass sand core funnel (G4 type glass sand core funnel) with a pore size of 3 μm, a polytetrafluoroethene microporous filter membrane with a pore size of 0.45 μm and a polytetrafluoroethene microporous filter membrane with a pore size of 0.22 μm successively.

EXAMPLE 17

Measured in mass percentage on the basis of the total mass of ink, 15% of phenolic resin, 25% of the mixture of propylene glycol monomethyl ether acetate and propylene glycol monomethyl ether butyrate (the mass ratio between propylene glycol monomethyl ether acetate and propylene glycol monomethyl ether butyrate is 2:1) and 60% of deionized water (electric conductivity: <10 μS/cm) are mixed with stirring at room temperature. After phenolic resin is completely dissolved, the solution is undergone multistage filtration to remove insoluble substances and/or impurities. The obtained filtrate is the ink. The multistage filtration is carried out by a glass sand core funnel (G1 type glass sand core funnel) with a pore size of 25 μm, a glass sand core funnel (G4 type glass sand core funnel) with a pore size of 3 μm, a polytetrafluoroethene microporous filter membrane with a pore size of 0.45 μm and a polytetrafluoroethene microporous filter membrane with a pore size of 0.22 μm successively.

EXAMPLE 18

Measured in mass percentage on the basis of the total mass of ink, 15% of phenolic resin, 20% of the mixture of propylene glycol monomethyl ether, propylene glycol monomethyl ether acetate and propylene glycol monomethyl ether butyrate (the mass ratio of propylene glycol monomethyl ether:propylene glycol monomethyl ether acetate:propylene glycol monomethyl ether butyrate is 1:1:2), and 65% of deionized water (electric conductivity: <10 μS/cm) are mixed with stirring at room temperature. After phenolic resin is completely dissolved, the solution is undergone multistage filtration to remove insoluble substances and/or impurities. The obtained filtrate is the ink. The multistage filtration is carried out by a glass sand core funnel (G1 type glass sand core funnel) with a pore size of 25 μm, a glass sand core funnel (G4 type glass sand core funnel) with a pore size of 3 μm, a polytetrafluoroethene microporous filter membrane with a pore size of 0.45 μm and a polytetrafluoroethene microporous filter membrane with a pore size of 0.22 μm successively.

What is claimed is:

1. An ECO-solvent ink for ink-jet computer-to-plate, wherein calculated in mass percent and based on the total mass of the ECO-solvent ink, the ECO-solvent ink comprises:

| | |
|---|---|
| cross-linkable resin | 5%~20% |
| light solvent | 5%~25% |
| deionized water | 55%~90% | the cross-linkable resin is at least one selected from the group consisting of epoxy resin and phenolic resin, and
the light solvent is at least one selected from the group consisting of propylene glycol monomethyl ether acetate, propylene glycol monomethyl ether propionate and propylene glycol monomethyl ether butyrate.

2. The ECO-solvent ink for ink-jet computer-to-plate according to claim 1, wherein the deionized water has an electric conductivity of lower than 10 μS/cm.

3. A method for preparing an ECO-solvent ink for ink-jet computer-to-plate,
the method comprising the following steps: mixing with stirring at room temperature cross-linkable resin in an amount of 5%~20%, light solvent in an amount of 5%~25% and deionized water in an amount of 55%~90% to obtain a mixed solution where the crosslinkable resin is dissolved completely, and where the amounts are calculated in mass percentage and based on the total mass of the ECO-ink; and
carrying out multistage filtration on the mixed solution to remove one or more of insoluble substances or impurities to obtain a filtrate as the ECO-ink, wherein
the cross-linkable resin is at least one selected from the group consisting of epoxy resin and phenolic resin, and
the light solvent is at least one selected from the group consisting of propylene glycol monomethyl ether acetate, propylene glycol monomethyl ether propionate and propylene glycol monomethyl ether butyrate.

4. The method according to claim 3, wherein the deionized water has an electric conductivity of lower than 10 μS/cm.

5. The method according to claim 3, wherein the multistage filtration is carried out by filtering the mixed solution with sand core funnel and filter membrane successively.

6. The method according to claim 5, wherein the filter membrane is a filter membrane with a micron-level pore size.

* * * * *